United States Patent [19]

Schmidt

[11] 4,440,838
[45] Apr. 3, 1984

[54] LEAD ACID BATTERY, SEPARATOR THEREFOR

[75] Inventor: George F. Schmidt, Neenah, Wis.

[73] Assignee: Kimberly-Clark Corporation, Neenah, Wis.

[21] Appl. No.: 385,737

[22] Filed: Jun. 7, 1982

[51] Int. Cl.$^3$ .............................................. H01M 2/16
[52] U.S. Cl. .................................... 429/250; 429/254
[58] Field of Search ............... 429/250, 247, 254, 251, 429/252

[56] References Cited

U.S. PATENT DOCUMENTS

| | | | |
|---|---|---|---|
| 3,870,567 | 3/1975 | Palmer et al. | 429/250 |
| 3,933,525 | 1/1976 | Palmer et al. | 429/250 |
| 3,967,978 | 7/1976 | Honda et al. | 429/250 |
| 4,210,709 | 7/1980 | Doi et al. | 429/250 |

FOREIGN PATENT DOCUMENTS 2017184  10/1979  United Kingdom ............... 429/250

OTHER PUBLICATIONS

*The Condensed Chemical Dictionary,* Ninth Edition 1977, p. 691.

Primary Examiner—Donald L. Walton
Assistant Examiner—Gerard P. Rooney, Jr.
Attorney, Agent, or Firm—Wendell K. Fredericks; R. Jonathan Peters; Paul A. Leipold

[57] ABSTRACT

An improved battery separator for lead-acid battery cells has low resistance to electrolyte ion transfer and can assist in holding paste in contact with a grid of an electrode plate during chemical reactions of the cell. The separator is formed by depositing an improved wetting composition to a polyolefin substrate comprised of entangled microfibers. The wetting composition which is deposited over and adhered to external surfaces of the microfibers is comprised of a substantially homogeneous admixture of an epoxy emulsion and a polyfunctional amine curing agent. When the separator is immersed in electrolyte, the amine groups in the cured resin of the wetting composition react with the acid electrolyte and are substantially completely neutralized forming a polymeric salt; in the process the fibers are rapidly wetted, providing a substantially permanent wetting characteristic in the electrolyte.

9 Claims, 6 Drawing Figures

LEAD ACID BATTERY, SEPARATOR THEREFOR

FIELD OF THE INVENTION

This invention relates generally to battery separator systems and particularly to materials used as separators in cells of lead-acid batteries.

BACKGROUND ART

An illustrative environment where application of the principles of the present invention is particularly advantageous is in electrochemical cells such as, for example, lead-acid cells containing plates made of a grid and a paste applied thereon. The grid, oftimes made of pure lead or an alloy of lead, is used principally to hold the paste in place, the paste for the positive plate is usually comprised of lead oxide, sulfuric acid and usually some type of fiber to increase strength and reduce mud formation. The paste for the negative plate may be comprised of lead oxide and other substances such as barium or strontium sulfate, lampblack and organic additives.

The major function of the separator is to separate the positive plate from the negative plate in a cell. The separator also holds the paste on the plates keeping the paste from falling to the bottom of the cell forming mud. Most battery manufacturers desire to pack as many plates as possible in a given cell to provide maximum energy density per cubic foot. Such packing leaves minimum room for separators.

The material used to form the separator must be an insulator to prevent conduction of electrons between plates and must not introduce impurities into the electrolyte which would be detrimental to the battery's performance. This material should provide low resistance to transfer of electrolyte ions yet be impervious to the corrosive nature of electrolyte and plate materials.

Today, polyolefin materials are of a great interest to manufacturers for use as separator material in battery cells. Surface modification of nonwettable fibers is one of the major approaches used to give polyolefins a wettability characteristic in aqueous battery systems.

U.S. Pat. No. 4,072,802 dated Feb. 7, 1978 to Murata et al discloses a separator for lead-acid batteries comprised of an embossed thin web polypropylene nonwoven material having projecting embossed parts, wherein the web is made wettable after formation with a composition consisting of polyvinyl chloride, silicon oxide and with tetrahydrofuran. This material allegedly provides a suitable acid electrolyte wettability of the polyolefin; however, the embossed parts do not appear to aid in packing plates with separators for maximizing energy density per cubic foot.

U.S. Pat. No. 3,933,525 dated Jan. 20, 1976 to Palmer et al discloses a process for producing a battery separator material suitable for use in a lead acid cell which involves incorporating surfactants having low water solubility in a polymeric resin before the polymeric fibers are extruded. It has been necessary, apparently, to use a second surfactant after the extruded nonwoven material is formed to achieve adequate wetting.

A search for various other means of providing a thin wettable polyolefin separator material that has low electrical resistance, good particle retention, high puncture resistance and that would permit battery manufacturers to pack as many plates as possible in a lead-acid battery cell was initiated. This search was successful and resulted in the present invention.

SUMMARY OF THE INVENTION

The present invention is directed to an improved battery separator of an electrode separation system for use in a lead-acid battery cell that allows easy access of electrolyte to an electrode while providing a low resistance passageway for electrolyte ion transfer.

The improved separator includes a flexible fibrous substrate and an improved wetting composition adhered thereto. The substrate material, which is sometimes shaped to form a housing for receiving an electrode, is preferably a flexible fibrous, and porous meltblown polymeric web, made up of a plurality of physically entangled microfibers which are resistant to strong acid and oxidation.

When the housing is formed, the separator material is folded in half and it is sealed along cut edges by means suitable for providing bonds which are resistant to strong acids and oxidation. However, because of the hydrophobic nature of polyolefin, the meltblown polymeric web without modification does not wet when disposed in an aqueous media, hence it is necessary to employ means for making the substrate wettable and also to provide a structure which will remain substantially permanently wet in acid electrolyte and permit packaging a maximum number of electrode plates to achieve maximum energy density.

The means for making the meltblown web wettable involves the use of a composition which includes an epoxy emulsion and a curing agent that reacts with an epoxy compound in the emulsion. The epoxy emulsion includes an epoxy compound, a wetting agent and an emulsifier. Suitable epoxy compounds are uncured synthetic epoxy resins. A suitable wetting agent is a nonionic surfactant having an HLB number below 5. One suitable emulsifier is dioctyl sodium sulfosuccinate. A suitable class of curing agents is low molecular weight polyamines. An especially suitable class of curing agent is the polyethylene imines.

When the emulsion is prepared, the epoxy compound, the wetting agent, and the emulsifier are mixed forming an oil phase. Water is added to the oil phase and stirred vigorously until a homogeneous liquid emulsion is formed. Then the curing agent is added to the premixed emulsion along with dilution water to form a saturant at the desired solids content.

The substrate is immersed in the saturant and then the excess saturant is removed by passing the saturated substrate between squeeze rolls. The saturated substrate is dried and then cured, so that the epoxy compound in the emulsion becomes highly crosslinked forming the uncalendered novel separator material. The epoxy-treated substrate may be calendered, forming a uniform structure of reduced caliper with microscopic interstices between fibers that are sufficiently large to be permeable to the electrolyte. The cured composition adhered to the fibers is a type that opposes fiber-to-fiber bonding of the compacted substrate.

When the thus coated separator material is immersed in, for example 37% $H_2SO_4$ electrolyte, the cured composition containing tertiary amine groups, which are highly alkaline are neutralized by the $H_2SO_4$ forming a salt. Neutralization of the amine is a strong driving force in the wetting process. The low HLB wetting agent component in the cured composition provides further help in speeding the rate of wetting which is within one second of the material being immersed in the electrolyte. The separator material remains substantially permanently wetted while immersed in $H_2SO_4$ electrolyte.

BRIEF DESCRIPTION OF THE DRAWING

Referring to the drawing figures, in which like numerals represent like parts in the several views.

DETAILED DESCRIPTION OF THE PREFERRED EMBODIMENT

Figure 1:
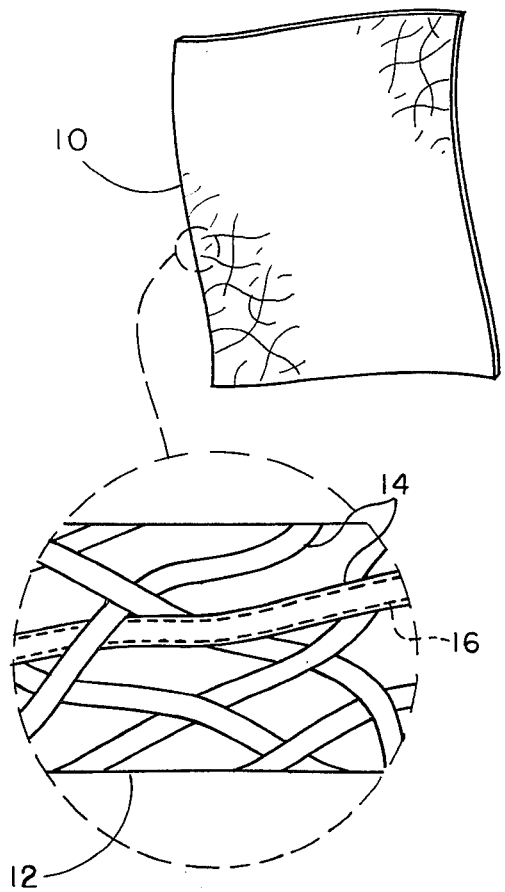
FIGS. 1 and 2 are exaggerated microscopic illustrations of a portion of a sheet of the separator material of this invention prior to and after compaction, respectively.

Referring to the drawing figures, FIG. 1 shows an enlarged view of a fragmentary portion of a separator 10 in accordance with the present invention, prior to being compacted. Separator 10 includes a fibrous polymeric substrate 12, and a deposited wetting composition 14 adhered to the surface of microfibers 16—16 throughout the substrate 12.

In the preferred embodiment, substrate 12 is comprised of a meltblown polypropylene web as described in U.S. Pat. No. 3,849,241 of Buntin et al having a basis weight in the range of from about 15 $gm/m^2$ to about 100 $gm/m^2$ and bonded primarily by physical entanglement to provide a strength of over about 1.5 lbs./in. width in the machine direction while maintaining good flexibility. The meltblown web has relatively small pores but a relatively high void volume, i.e. areas not occupied by fibers. This high void volume provides many capillary regions for retaining electrolyte. However, such a web, without modification, is quite hydrophobic and cannot absorb and hold diluted sulfuric acid ($H_2SO_4$) electrolyte.

Wetting composition 14, deposited over the external surface of microfibers 16 by conventional saturating and curing means, modifies the meltblown web of polyolefin fibers by raising the critical surface tension of substrate 12 with respect to the surface tension of a solution of 30-40% $H_2SO_4$ (sulfuric acid) electrolyte. Upon curing, substrate 12 with the wetting composition 14 deposited thereon becomes separator 10 which is now a hydrophilic material and remains so as long as separator 10 is immersed in $H_2SO_4$ electrolyte.

In a preferred embodiment, composition 14 is comprised of 73.5% of a premixed emulsion and 26.5% of a curing agent. The premixed emulsion is comprised of 70% of an uncured synthetic epoxy resin compound; 23.3% of a wetting agent and 6.7% of an emulsifier. The epoxy compound in the emulsion is a low molecular weight product sold under the tradename EPON 828 by Shell Chemical Company of Houston, Tex. The wetting agent is a high-molecular weight non-ionic surfactant sold under the tradename PLURONIC L121 by BASF-Wyandotte Chemicals Corporation of Wyandotte, Mich. and the emulsifier is dioctyl sodium sulfosuccinate sold under the tradename AEROSOL OT 75 by American Cyanamid Company of Wayne, N.J. The chosen curing agent is a polyethylene imine sold under the tradename CORCAT P-600 by Cordova Chemical Company of Sacramento, Calif.

Figure 2:
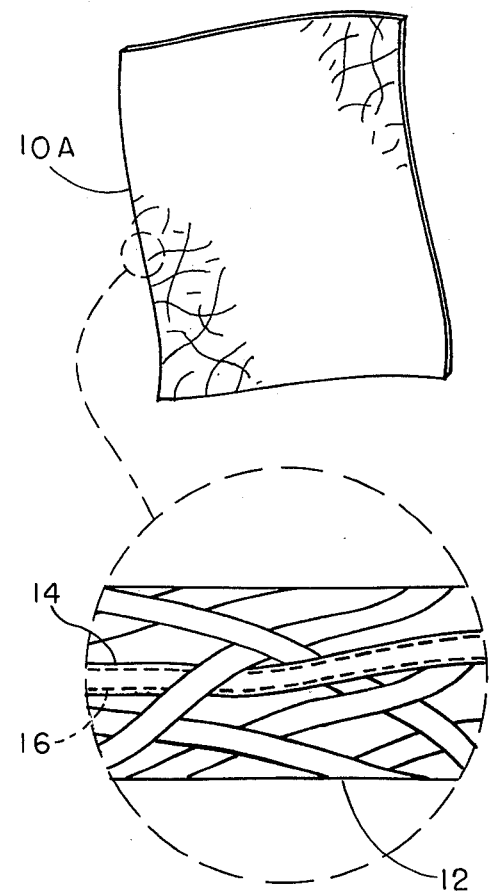

Generally, treated meltblown webs possess a porosity which is quite high; usually it is desirable to lower the porosity to a point whereat a particle barrier is created yet the web's resistance to electrolyte ion flow is not substantially increased. To lower the porosity of this novel web, compaction means may be employed to achieve caliper reduction. One means of compacting the epoxy treated web is to calender it at a temperature, illustratively at 225° F. between calender rolls to provide a uniform reduced caliper structure. The novel coating composition adhered to the fibers provides an antibonding characteristic to the fibers enabling the web's fibers to be compacted without the normal "bonding of fibers-to-fibers" occurring. Hence the porosity of the web is reduced yet the structural resistance to electrolyte ion flow is not effectively increased. FIG. 2 illustrates, in an enlarged view, a fragmentary portion of a calendered separator 10A.

The above described separator 10A of FIG. 2 when made from a 80 $gm/m^2$ melt blown polypropylene web, was found to have a resistivity of approximately 8 milliohms/in.$^2$ in 37% $H_2SO_4$ electrolyte, and wetted substantially completely within one second at room temperature.

It is appreciated by those skilled in the art that subjecting the separator material to the above described wettability test is a useful indicator as to the performance of the material when it is employed as a separator in working cells of a lead-acid battery.

In addition to the embodiment described above, other materials suitable for use as substrate material in this invention may include any polymeric web material resistant to strong acid and comprised preferably of micro-diameter fibers. The substrate may have a thickness in the range of about 5 to 20 mils and a basis weight in the range of 15 to 200 $gm/m^2$.

Other uncured synthetic epoxy compounds from condensation polymers of epichlorohydrin and bisphenol-A in the lower molecular weight range may be used as suitable alternatives for the EPON 828 epoxy resin used in the emulsion. Such resins can be polymerized by the addition of small amounts of organic polyamines to form clear, light-colored, and tough material with high physical strength and excellent chemical resistance. These epoxy compounds may comprise from about 50 to 95% of the emulsion within the coating and most preferably 50 to 60%. While these coating compositions work equally well from an aqueous or solvent base system it is preferable that the epoxy resin be applied from an aqueous system because of environmental and cost considerations.

Other nonionic surfactants within the block copolymer family of alkylene oxides make suitable surface-active wetting agent alternates for use in the emulsion of this invention. Wetting agents that are preferred are those which can be classified by their low ethylene oxide content and their low (hydrophilic/lipophilic balance) HLB number. The preferred HLB number for the wetting agents are those below 5. These low HLB number surfactants usually provide a substantially high degree of hydrophilicity to polypropylene fiber surfaces along with a relatively low wetting agent solubility so that the wetting agent will not be washed easily from the surface of the fiber. Such surfactants are extremely stable to acids, alkalies and most metallic ions. They are stable with other non-ionic, anionic and cationic surfactants. Other suitable wetting agents for use in the emulsion include low HLB members of ethoxylated fatty acids, fatty alcohols, alkyl phenols and fatty amides. The wetting agent may comprise from 5 to 50% by weight of the emulsion composition and most preferably 20 to 30%.

Many nonionic or anionic surfactants may be used as the emulsifier to prepare the emulsion. The suitability of a particular emulsifier is determined empirically. An especially effective, and preferred emulsifier is AEROSOL OT, which is a dioctyl ester of sodium sulfosuccinic acid. The emulsifier may comprise from 1 to 10% of the emulsion and most preferably from 3 to 5%.

Low molecular weight di- or poly-amines such as triethylenetetramine (TETA) and diethylaminopropylamine (DEAPA) have been used and give excellent cures. However, use of polyethylene imines is preferred because they provide lower levels of weight loss on extraction with either water or battery acid. Also polyamides formed by reacting dimer of linoleic acid, linolenic acid with ethylene-diamine (amine value 20–350) as well as polyfunctional amines may be used as curatives for the epoxy resin in the emulsion. The curing agent may comprise from 5 to 50% of the total composition, depending on the type and number of reactive functional groups it contains. With polyethylene imine, 30 to 40% of the curing agent in the saturant solids is preferred.

In preparing the wetting composition used to cover the fibers in the substrate of this invention, an emulsion of the epoxy resin is formed, then the emulsion is compounded into a saturant; the substrate is immersed in the saturant and then the excess saturant is removed by passing the saturated substrate between squeeze rolls. The saturated substrate is dried and then cured to form the uncalendered novel separator material. To form the emulsion, the epoxy compound and the wetting agent are mixed, forming the oil phase. Then the emulsifier and water are added to the oil phase and stirred vigorously on an Eppenbach homogenizer. The stirring is continued until a homogeneous liquid emulsion is formed.

Then the curing agent is added to the emulsion along with dilution water, forming a saturant at the desired solids content.

Suitable conventional saturation methods are used to saturate the surface of the fibers of substrate 12. The mixture is diluted with water to establish a level of total solid which will result in deposition of 5 to 25 parts of the saturant solids to 100 parts of fibers and most preferably 5 to 10 parts.

After the mixture is applied to the fibers of the substrate, the saturated substrate is squeezed with press rollers to remove the excess, and force dried with heat or other suitable means to accelerate the drying process. The dried substrate is cured in suitable curing means for one hour at from about 90° to 115° C. forming a high molecular weight crosslinked epoxy resin that is substantially insoluble in practically all liquid vehicles, the polyamine reacting substantially completely with the epoxy. The high temperature is not essential, but does provide somewhat improved resistance to extraction of the components of the mixture. Afterwards, if desired, the epoxy-treated substrate is calendered, illustratively to a thickness of from about ½ to ¾ of the original thickness of the substrate. Highly uniform caliper reduction is achieved because the epoxy reduces greatly additional bonding between the fibers of the substrate even at temperatures over 225° F. This allows for severe compaction without raising the electrical resistance excessively.

The preferred embodiment of separator material 10A of FIG. 2 has the following structure and properties: (1) microscopic interstices between the fibers sufficiently large to make the fibrous material very permeable to the electrolyte even though the web is compacted; (2) extremely high capillary retention as well as surface retention of electrolyte; (3) homogeneous diffusion and interaction of the composition materials and the electrolyte throughout the substrate; (4) rapid wetting of the fibers so as to provide minimum electrical resistance; and (5) strong resistance to decomposition throughout the useful life of the material.

Illustratively, upon immersion of separator 10A in 30 to 40% sulfuric acid electrolyte in forming a battery cell, the acid of the electrolyte wets the separator very rapidly. The separator is wetted more rapidly by acid than by water. Substantially all the amine groups, which are a strong base component, are neutralized and remain as a salt for as long as separator 10A is kept in the sulfuric acid electrolyte. Neutralization of these amine groups is a strong driving force in the wetting process. The ethyleneoxide-propyleneoxide block copolymers on the low end of the HLB scale provide still further help in speeding the rate of wetting, without introducing easily extractible components.

Prior to compacting the cured material, the microscopic interstices between the coated fibers may be of a sufficiently large size that they do not provide a sufficient barrier to undesirable passage of particles which normally slough off the electrode during diffusional flow through the separator during cell operation. However after compacting the cured separator material, the size of the interstice can be varied and made sufficiently small to form a sufficient barrier to these particles yet sufficiently large not to hamper electrolyte ion transfer, yielding a substantially low resistance separator material. If the substrate of separator 10 of FIG. 1 is compacted without the cured epoxy resin deposited thereupon, then the resistance of the material would be extremely high. But with the epoxy resin present, the substrate material can be compacted without bonding fiber-to-fiber; such fiber-to-fiber bonding occurs when bare substrate material (i.e. without the curative coating) is compressed.

Another formulation for the film coating which provides a great reduction in cost of the substrate treatment without any detectable loss of properties includes clay in the saturant. To prepare this cost saving formulation, the new composition is comprised of 35% of the premixed emulsion; 10.8% of the curing agent and 54.2% of an inert filler. The premixed emulsion is comprised of 70% of the uncured epoxy products; 23.3% of the wetting agent and 6.7% of the emulsifier.

The preferred inert filler is kaolin clay, one example of which is a hydrophilic pigment sold under the trade name Ultra White 90 by Engelhard Minerals and Chemical Corporation of Edison, N.J. Other suitable inert fillers may be selected and used from the group consisting of inorganic materials such as silicates, aluminates and the like, which serve as low cost diluents. Also depending on which substrate material is employed, these alternate fillers may be comprised from about 0% to 60% by weight of the total composition.

Figure 2A:
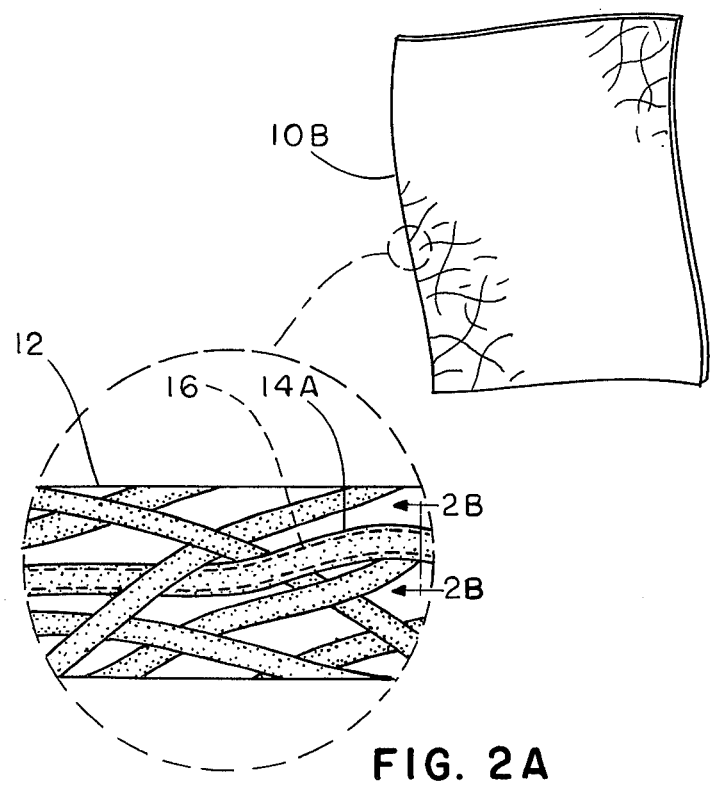
FIG. 2A is an illustration of a second embodiment of FIG. 2.
Figure 2B:
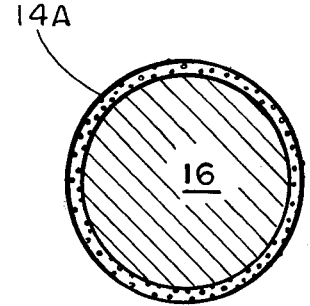
FIG. 2B is a microscopic illustration of a cross-section of a fiber of the separator material of FIG. 2A.

When this new composition illustrated as 14 of FIG. 2A is used in the lead-acid cell, the cured epoxy resin is utilized as a binder to hold the filler particles to the fibers of the web. The filler although insoluble in the electrolyte has an affinity for water, thus the fillers in the new composition provide filler sites over the fibers as illustrated in FIG. 2B which holds water on the fibers aiding in the wetting of the separator material.

When battery cells of the type which may include lead electrodes are manufactured, a separator is used to isolate the positive plate from the negative plate. Oftimes, when multicells are employed each negative plate is enveloped in the separator material providing the isolation. These envelopes are formed illustratively by heat sealing or ultrasonically bonding two sheets of separator material on three sides so as to permit inserting the electrode through the fourth side. The envelopes are capable of retaining any electrode material shedding which might occur during use and are substantially unaffected by vibration of the electrodes disposed in the battery.

Figure 3:
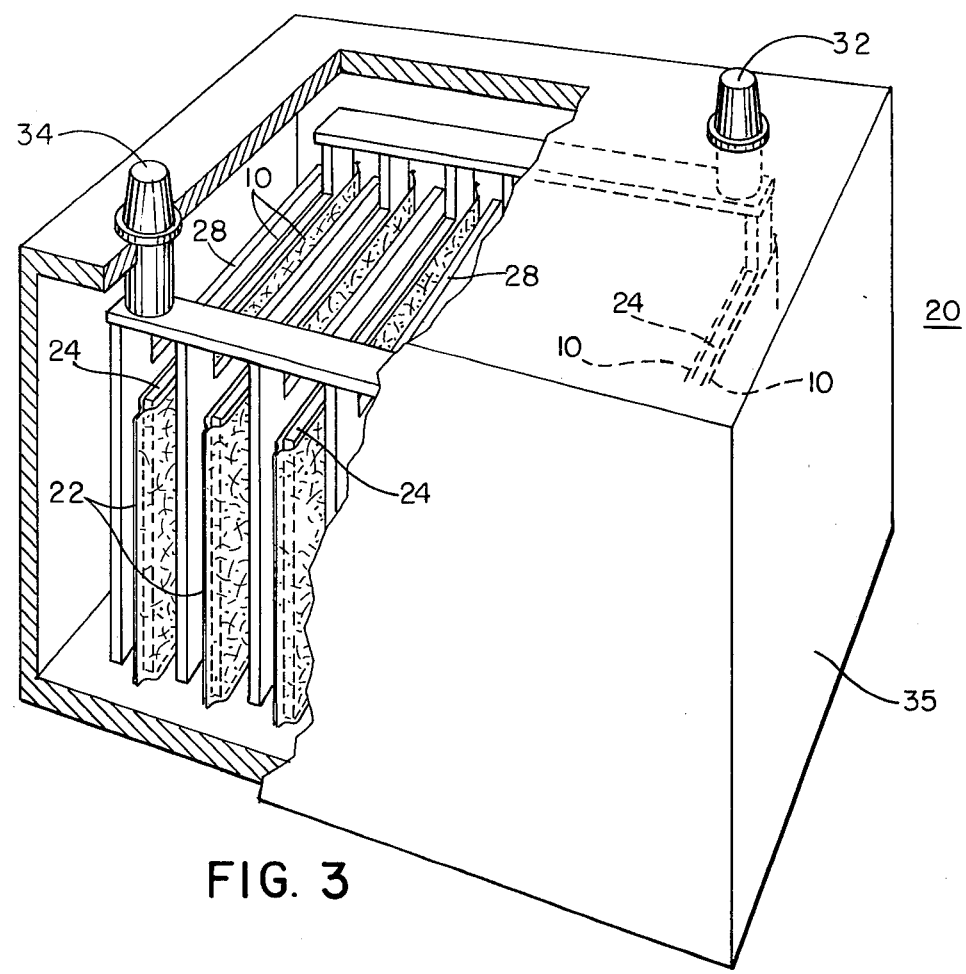
FIG. 3 is a perspective view of a lead-acid battery with a cutaway portion to illustrate a cell of the battery with the negative electrode enclosed in an envelope formed from the separator material of this invention.
Figure 4:
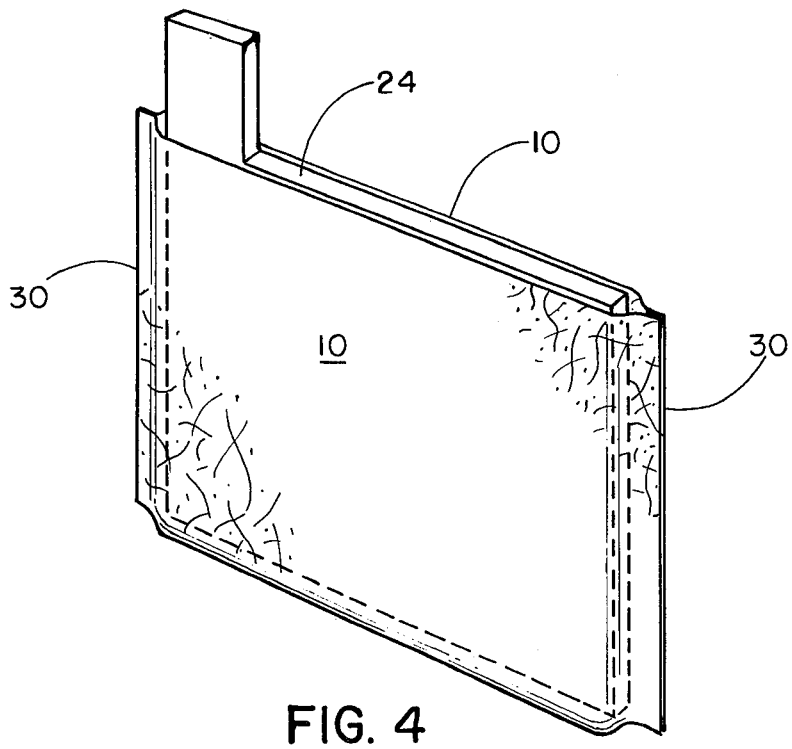
FIG. 4 is a sectional view of a battery plate partially inserted in a battery separator envelope.

With reference to FIG. 3, there is illustrated in exaggerated size for illustrative purposes a cutaway view of a lead acid battery cell 20 comprising a container 35 with a separator envelope 22 disposed about a negative electrode 24 the positive electrode 28 is not so enclosed. Envelope 22 comprises a pair of battery separators 10—10 of the separator material of this invention best seen in FIG. 4. The separators are sealed along edges 30—30 by a suitable ultrasonic or heat sealing means to form envelope 22. In cell 20, the negative electrode 24 is enclosed in envelope 22 since reduction occurs at the negative electrode during charging and shedding often occurs causing particles from the electrode to disperse into the electrolyte.

The electrodes 24 and 28 are suitably electrically connected to negative and positive terminals 32 and 34 respectively to form opposite polarity cell output terminals. The electrodes and envelopes are partially immersed in a solution of electrolyte 25, preferably a 35-45% solution of sulfuric acid. A port may be provided (not shown) to permit venting excess gas which might develop during charging and to provide an access aperture for adding electrolyte.

It is to be understood that the above described embodiments are mainly illustrative of the principles of the invention. One skilled in the art may make changes and modifications to the embodiments without departing from the scope and the essential characteristics therefore.

What is claimed is:

1. A battery separator for physically separating battery plates immersed in a solution of sulfuric acid electrolyte in a lead-acid battery cell, and for holding paste on a grid of a plate of the cell so as to oppose shedding of paste from the surface of the grid, preventing shedded portions of the paste from dropping off the grid and falling to the bottom of the cell as mud, comprising:
(a) a flexible and fibrous polyolefin substrate comprised of a plurality of physically entangled microfibers; and
(b) a wetting composition deposited upon and adhered to external surfaces of said microfibers, said composition comprising of an admixture of:
   (1) an epoxy emulsion comprised of:
      (i) an epoxy compound,
      (ii) a wetting agent, and
      (iii) an emulsifier, and
   (2) a polyamine curing agent, said emulsion and said curing agent when admixed and cured at a suitable curing temperature providing a crosslinked epoxy compound, said crosslinked compound being characterized by having an insoluble property as well as a hydrophilic property in said electrolyte, said wetting agent being of the type which when immersed in and in contact with said electrolyte solution remains on the fiber and does not dissolve into the electrolyte and yet provides rapid wetting, the crosslinked epoxy compound containing tertiary amine groups, in the form of a polymeric salt, said salt being disposed over the surface of said microfibers after neutralization raising the critical surface tension thereof above that of the electrolyte, thus said raised critical surface tension of said microfibers permitting said electrolyte to wet the salt rapidly, the wetting of said salt being substantially permanent while said separator is immersed in said electrolyte.

2. The separator in accordance with claim 1, wherein said coated microfibers wet within one second after being immersed in said electrolyte.

3. The separator of claim 1, wherein said substrate is a web of entangled fibers capable of being compressed to achieve a uniform caliper reduction, wherein said cured wetting composition is adhered to external surfaces of said microfibers, wherein said substrate with said cured composition adhered thereon is compacted to a desired caliper at a chosen temperature, and wherein microscopic interstices between fibers of said compacted substrate are sufficiently large to be permeable to said electrolyte, the cured composition adhered thereon opposing fiber-to-fiber bonding of said compacted substrate.

4. The separator of claim 3 wherein said wetting composition is diluted with a diluent to form a saturant having a level of total solids which will result in deposition of 5 to 25 parts of saturant solids to 100 parts of fibers of said web.

5. The separator of claim 1 wherein said emulsion is comprised of about 50 to 95% of an epoxy compound, from about 5 to 50% of a wetting agent and from about 1 to 10% of an emulsifier wherein said curing agent is comprised of from about 5 to 50% of a low molecular weight polyamine.

6. The separator of claim 5 wherein said epoxy compound is an uncured synthetic epoxy resin, said wetting agent is a non-ionic surfactant, having a hydrophilic/lipophilic balance number below 5, said emulsifier is dioctyl sodium sulfosuccinate and said curing agent is a polyethylene imine.

7. The separator of claim 1 wherein said emulsion includes an inert hydrophilic filler, wherein said filler is selected from the group consisting of kaolin, silicates and aluminates, and wherein said filler comprises from about 0 to 60% by weight of said total wetting composition.

8. A separator in accordance with claim 1 wherein said substrate is a meltblown polypropylene web having a basis weight of from about 15 grams/m$^2$ to about 100 grams/m$^2$ and bonded primarily by physical entanglement to provide a strength of about 1.5 lbs. per inch width in the machine direction while maintaining good flexibility.

9. An improved battery separator for use in a lead-acid battery cell for physically separating electrodes of the cell and for preventing electrode paste from dislodging from an electrode grid while allowing diffusional flow of acid electrolyte solution during chemical reactions of the cell, said separator comprising a flexible and fibrous polyolefin substrate made up of a plurality of physically entangled microfibers, resistant to strong acids and oxidation, said substrate being permeable to electrolyte ion transfer, said improvement comprising:

a wetting composition deposited over and adhered to external surfaces of said microfibers, said composition comprising a substantially homogeneous admixture of:
(a) epoxy emulsion; and
(b) a curing agent that reacts with an epoxy compound in said emulsion, said curing agent being comprised from about 5 to 50% of a polyamine, said polyamine having a cross-linking property being activated when said coating composition is cured at a desired temperature to form a high molecular weight crosslinked epoxy compound; said admixture being of the type which when immersed in and in contact with said electrolyte solution reacts with said solution to form a polymeric salt, said salt being disposed over the surface of said microfibers raising the critical surface tension thereof, said raised critical surface tension permitting the electrolyte to rapidly wet said fibers, the wetting of the fiber surface being substantially permanent while said separtor is immersed in the electrolyte;

said substate with said wetting composition adhered to external surfaces of said microfiber is compacted in a manner to achieve highly uniform caliper reduction, wherein said caliper reduction being such that the microscopic interstices between fibers are kept sufficiently large to be permeable to the electrolyte and wherein said web with said composition adhered thereto is compacted without fiber-to-fiber bonding occurring.

* * * * *